Dec. 21, 1965     R. E. HUME     3,225,255
BALLAST APPARATUS
Filed April 9, 1962     3 Sheets-Sheet 2
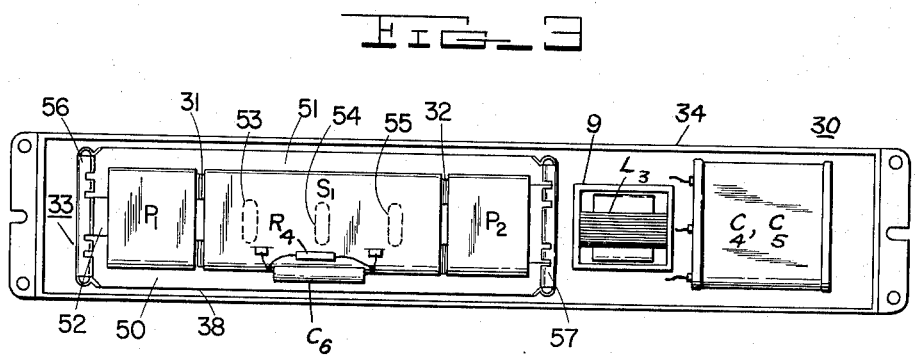
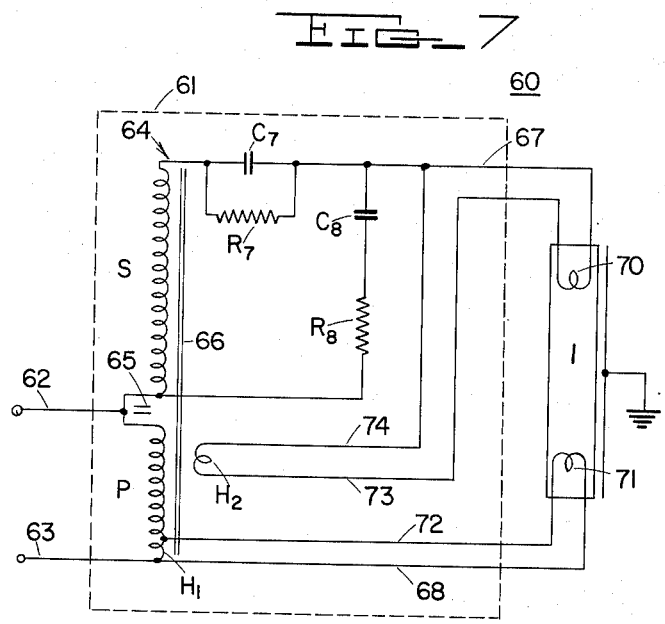
INVENTOR.
Roger E. Hume,
BY
Attorney.

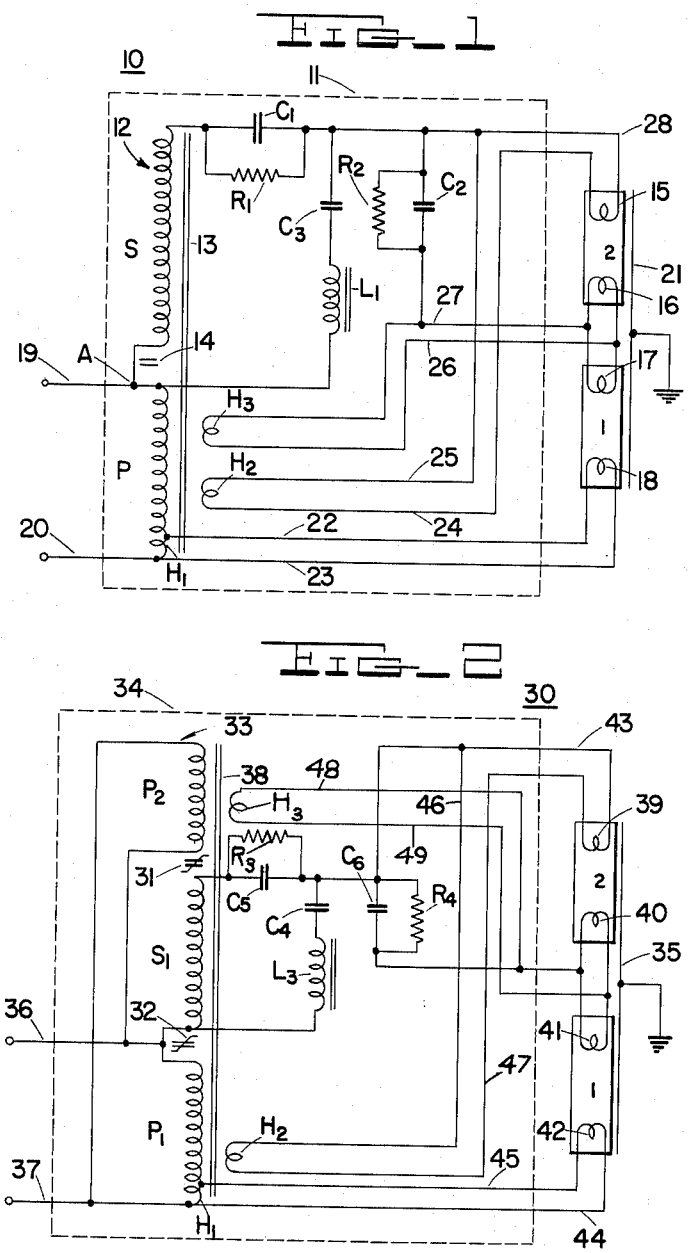

Dec. 21, 1965   R. E. HUME   3,225,255
BALLAST APPARATUS
Filed April 9, 1962   3 Sheets-Sheet 3
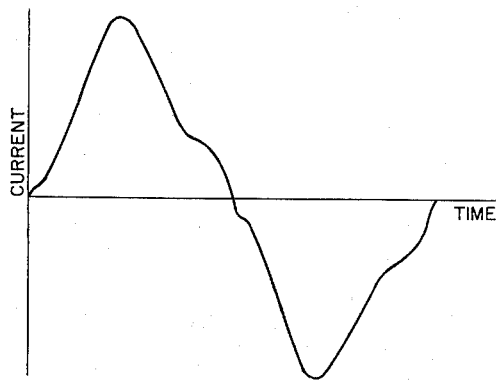
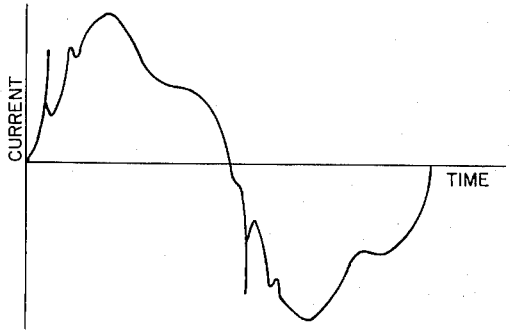
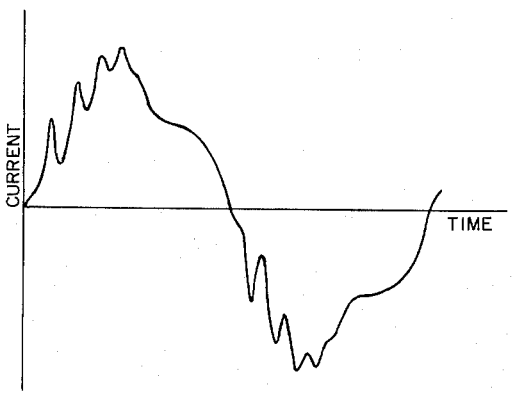
INVENTOR.
Roger E. Hume,
BY
Attorney.

United States Patent Office 3,225,255
Patented Dec. 21, 1965

3,225,255
BALLAST APPARATUS
Roger E. Hume, Danville, Ill., assignor to General Electric Company, a corporation of New York
Filed Apr. 9, 1962, Ser. No. 186,129
11 Claims. (Cl. 315—232)

This invention relates to ballast apparatus for starting and operating gaseous discharge lamps. More particularly, it relates to such ballast apparatus employing high reactance transformers having a shunting capacitor connected in parallel circuit relation with the transformer secondary.

The open circuit R.M.S. (root means square) voltage that must be provided by a high reactance transformer to start a particular fluorescent lamp or lamps varies with the lamp length. The peak voltage requirement of a fluorescent lamp depends upon the lowest temperature at which it is desired to provide reliable starting. For example, the R.M.S. open circuit voltage required to start two 96 inch Power Groove PG 17 rapid start lamps in series with a starting capacitor connected across one of the lamps is approximately 470 volts. The peak voltage requirement for two such lamps for a low temperature rating of zero degrees centigrade is approximately 575 volts. The R.M.S. open circuit voltage requirement for two 48 inch Power Groove PG 17 lamps connected in series with a starting capacitor is 265 volts and for a low temperature rating of zero degrees centigrade, a peak voltage of 575 must also be provided.

High reactance transformers, which are widely used in ballast apparatus to provide the requisite voltages required to start and operate the lamp or lamps, have a shell type core with a center elongated winding leg. A primary and secondary winding are inductively coupled on the elongated winding leg, and a capacitor is usually connected in series circuit with the secondary winding to provide a net capacitive reactance in the secondary circuit of the transformer. Due to the net capacitive reactance in the secondary circuit, the lamp or lamps connected in the secondary circuit are supplied with a leading current. The secondary winding of such a circuit is referred to herein as a lead secondary.

As current flow through the lead secondary winding increases, the magnetic flux resulting from this current flow causes portions of the magnetic core under the lead secondary winding to saturate. Although good regulation is obtained when a magnetic core is operated in the saturated condition, the crest factor of the lamp, which is the ratio of the value of peak current to the value of the R.M.S. current, is not generally satisfactory with a high reactance transformer having no provision for controlling leakage reactance, particularly when it is used to operate rapid start lamps of higher wattage ratings.

In a high reactance transformer the secondary voltage under open circuit conditions is a function of the turns ratio of the secondary and primary windings and the coupling factor. As the term is used herein, coupling factor denotes the ratio of the secondary magnetizing reactance divided by the sum of the secondary magnetizing reactance and the leakage reactance of the transformer. From this relationship, it will be seen that the coupling factor approaches unity as the leakage reactance approaches zero. Thus, to provide a desired value of open circuit voltage with minimum number of secondary turns, it is desirable to maintain the leakage reactance at the lowest possible value consistent with good performance and good regulation of the secondary current. It will be appreciated that because of the negative resistance characteristic of the gaseous discharge lamp, it is necessary to provide sufficient leakage reactance for regulation of the secondary current of the ballast transformer. To a large extent, the regulation of the secondary current is dependent upon the leakage reactance.

In general, a design of a ballast apparatus that has minimum leakage reactance consistent with good performance and current regulation is particularly desirable in a ballast apparatus in which the net reactance of the secondary circuit is predominantly capacitive. Reducing the leakage reactance in such a ballast apparatus results in an increase in the coupling factor. Consequently, it is possible by increasing the coupling factor to reduce the number of turns of the secondary winding and the magnetic core length thereby effecting an appreciable saving in copper and iron.

A reduction in the leakage reactance in a lead secondary circuit is also desirable since it results in an increase in leakage reactance current late in each half cycle of the lamp current to cause an increase in the lamp current whereby the lamp current waveform is improved. It will be appreciated, therefore, that a ballast having a minimum value of leakage reactance consistent with good current regulation will provide a ballast apparatus that for a given light output will require fewer secondary turns and less lamp current.

In the past various arrangements for controlling leakage reactance have been employed. In U.S. Patent No. 3,010,050—Hume et al., an improvement in the waveform of the lamp current is achieved by using nonlinear shunts between the primary and secondary windings of a high reactance transformer. The nonlinear shunts serve to control the leakage reactance in each half cycle so that during the early portion of each half cycle of the secondary current the leakage reactance is relatively greater than the leakage reactance provided during the later portion of each half cycle.

It has also been a practice in certain ballast apparatus to connect in shunt with a lead secondary winding of a high reactance ballast transformer a shunting capacitor tuned to provide preselected harmonic components to aid in starting. With such an arrangement a higher R.M.S. open circuit voltage can be provided for lamp starting for a given number of secondary turns. In other words, it is possible to reduce the number of secondary turns for a given R.M.S. voltage requirement. This reduction in the number of secondary turns also results in a decrease in leakage reactance.

The use of a split primary winding arrangement wherein a portion of the primary winding is coupled with the secondary winding at each end thereof has also been used as an expedient to increase the coupling factor of the ballast transformer. Thus, a split primary arrangement makes it possible to reduce the number of secondary turns for a given R.M.S. voltage requirement and thereby reduce the leakage reactance.

Where a tuned shunting capacitor is used in conjunction with a split primary winding arrangement to provide a ballast transformer designed for a minimum leakage reactance, difficulties have been encountered in practice. For example, in such a ballast apparatus designed to operate a pair of 96 inch Power Groove lamps in a series lead circuit, a condition of current instability was found to exist. This condition of current instability could readily be observed when the lamp current waveform was viewed on an oscilloscope. As seen on the oscilloscope the current peaks provided by the shunting capacitor were not symmetrical with the current peaks in the subsequent half cycle. Such a condition of current instability is unsatisfactory in a ballast design. It is therefore desirable that an improved arrangement be provided whereby the benefits of a low leakage reactance design can be fully realized in a ballast apparatus utilizing expedients for minimizing the amount of leakage reactance in the secondary circuit, as for example, a split primary and tuned capacitor arrangement.

Accordingly, a general object of the present invention is to provide an improved ballast apparatus for starting and operating a gaseous discharge lamp, such as a fluorescent lamp, that is characterized by improved operating characteristics.

It is a more specific object of the invention to provide an improved ballast having a shunting capacitor tuned to provide harmonic starting wherein a stable lamp current is provided during operation thereof. The term "stable lamp current," as used in the detailed description of my invention and in the appended claims, denotes a lamp current wherein the current peaks provided by a tuned capacitor in one half cycle of the waveform of the instantaneous values of the lamp current during operation of the ballast apparatus are substantially symmetrical with the current peaks in the subsequent half cycle.

It is still another specific object of the invention to provide an improved ballast apparatus that will permit the use of a tuned shunting capacitor and split primary arrangement to achieve the benefits resulting from a ballast apparatus having a comparatively lesser amount of leakage reactance.

Still another object of my invention is to provide an improved ballast apparatus for starting and operating a pair of fluorescent lamps in an improved series lead circuit arrangement.

In accordance with one form of the invention, I have provided a ballast apparatus for starting and operating one or more lamps in a series lead circuit. In this apparatus an impedance element is utilized in conjunction with a tuned shunting capacitor, which is connected in parallel circuit relation with a secondary winding of the high reactance ballast transformer. The impedance element, which may be a resistor or an inductor, is connected in the discharge path of the shunting capacitor for controlling the discharge of the capacitor in each half cycle. In the preferred form of the invention, the impedance element is connected in series with the shunting capacitor across the secondary winding. Further, the shunting capacitor is preferably tuned with the secondary winding to provide an open circuit voltage having substantially seventh harmonic components.

The subject matter which I regard as my invention is set forth in the appended claims. The invention itself, however, together with further objects and advantages thereof, may be better understood by referring to the following description taken in connection with the accompanying drawing in which:

FIGURE 1 is a schematic circuit diagram of one form of the ballast apparatus according to the invention;

FIGURE 2 is a schematic circuit diagram of another embodiment of a ballast apparatus of my invention;

FIGURE 3 is a plan view of a ballast apparatus corresponding to the transformer shown schematically in FIGURE 2, the circuit connections having been omitted;

FIGURE 4 illustrates the lamp current waveform for the ballast apparatus of the type shown schematically in FIGURE 2 operated with both the impedance element and shunting capacitor excluded from the secondary circuit;

FIGURE 5 illustrates the lamp current waveform for the ballast apparatus of the type shown schematically in FIGURE 2 operated without an impedance element in the discharge control path of the shunting capacitor;

FIGURE 6 illustrates the lamp current waveform for the improved ballast apparatus in accordance with the invention shown in FIGURE 2; and FIGURE 7 illustrates a ballast apparatus in accordance with the invention for operating a single fluorescent lamp.

Referring now more particularly to the embodiment of my invention illustrated in FIGURE 1, a ballast apparatus is generally identified by reference number 10 and is shown enclosed in a dashed rectangle 11 which schematically represents a ballast case. The ballast apparatus 10 includes a high reactance transformer 12 having a magnetic core 13, magnetic shunts 14, a primary winding P and a secondary winding S inductively coupled therewith. A plurality of cathode heating windings $H_1$, $H_2$, $H_3$ are inductively coupled with the primary winding P to supply heating current to the lamp filaments 15, 16, 17, 18. A pair of input terminal leads 19, 20 are provided for connection to a suitable alternating power supply (not shown) such as a 60 cycle, 115 volt alternating supply.

Lamps 1 and 2, which are fluorescent lamps of the rapid start type, are preferably positioned in close proximity to a grounded conductive fixture or plate 21 so that lamps 1 and 2 are disposed in capacitive relationship therewith. Since it is generally required that the conductive fixture 21 be grounded, it may be desirable but not necessary to connect a low potential point in the ballast circuit to the ballast transformer case 11 through an impedance means such as a resistor (not shown).

In the embodiment of the invention illustrated in FIGURE 1, a flux leakage path 14 is provided between the primary winding P and the secondary winding S. The flux leakage path, if desired, may be formed through nonmagnetic material, such as air, or through magnetic material by the provision of projecting shunt legs formed on the magnetic core or by inserting shunts between the primary winding P and secondary winding S.

Continuing further with the description of the ballast apparatus 10, it will be seen that the cathode heating windings $H_1$, $H_2$ $H_3$ continually supply the filaments 15, 16, 17 and 18 of lamps 1 and 2 with heating current during operation. Cathode heating winding $H_1$, which is an extension of the primary winding P, is connected in circuit with filament 18 by output leads 22 and 23. Cathode heating windings $H_2$, $H_3$ are connected in circuit with cathodes 15, 16, 17 by output leads 24, 25, 26, 27 and 28. Cathode heating windings $H_2$, $H_3$ are preferably tightly coupled with the primary winding P and may, if desired, be wound directly over the primary winding P.

One end of the secondary winding S is connected in circuit with the primary winding P by an autotransformer connection identified by the letter A. The other end of the secondary winding S is connected in circuit with a series capacitor $C_1$, which provides a net capacitive reactance in the lamp circuit. It will be noted that the secondary winding S is connected with one terminal of lamp 2 by circuit means which include the series capacitor $C_1$ and output lead 28, while the other end of the serially connected lamp 1 is connected by output lead 23 to the end of the primary winding P which is connected to input terminal lead 20. The output current of the apparatus 10 is supplied at output leads 22, 23 and 24, 28.

A starting capacitor $C_2$ is connected across lamp 2 so that open circuit starting voltage is initially applied across the lamp 1. Resistors $R_1$ and $R_2$, which shunt the series capacitor $C_1$ and the starting capacitor $C_2$, are bleeder resistors and cause the charge to be bled off the capacitors $C_1$, $C_2$ when the circuit is de-energized.

In accordance with the invention, an impedance element $L_1$, preferably an inductor as shown in FIGURE 1, is connected in series circuit with a shunting capacitor $C_3$ that is connected in parallel circuit relation with the secondary winding S. Preferably, the shunting capacitor $C_3$ provides sufficient capacitive reactance in the secondary circuit to produce an open circuit voltage such that the capacitive reactance is tuned with the other circuit elements at a preselected harmonic frequency. The inductor $L_1$ is provided to control the discharge of the shunting capacitor $C_3$ in each half cycle and thereby provide for symmetry in the lamp current waveform. It was found that when an impedance element was not provided to control the discharge of the shunting capacitor $C_3$ in each half cycle, the rate of discharge was essentially a function of the lamp impedance. Since the lamp impedance can vary considerably with such factors as mercury pressure, cathode hot spot locations and room temperature, it was found that current spikes produced by the discharge of the shunting capacitor $C_3$ would vary in amplitude as much as plus or minus 10 percent in alternate half cycles.

According to the present invention, the rate of discharge of the shunting capacitor $C_3$ in each half cycle becomes a function of the fixed impedance provided by the impedance element connected in series circuit therewith. Hence, the rate of discharge and the current spikes produced by the discharge of the shunting capacitor $C_3$ are not subject to the random variations of the essentially variable impedance presented by the lamps 1 and 2. Although preferably an inductor $L_1$ is employed in the discharge path of the shunting capacitor $C_3$, it will be appreciated that an impedance element such as a resistor may be used to control the rate of discharge. However, the resistive value of the control resistor selected must be such that it will not overdampen the open circuit oscillatory voltage.

In FIGURE 2 I have illustrated another form of my invention as it is embodied in a ballast apparatus 30 employing nonlinear shunts 31, 32 which are described and claimed in U.S. Patent No. 3,010,050, granted on November 21, 1961, to Hume et al. It is possible by connecting an impedance element $L_3$ in series with a shunting capacitor $C_4$ across secondary winding $S_1$ of a ballast transformer 33 to obtain further improvements in the performance characteristics of the ballast apparatus 30 and to achieve a design having a lower leakage reactance.

The ballast apparatus 30 as shown in FIGURE 2 is enclosed in a dashed rectangle 34 which schematically represents the ballast case. The lamps 1 and 2 are disposed in capacitive relationship with a grounded conductive fixture 35. The high reactance transformer 33 includes a pair of primary windings $P_1$ and $P_2$ connected in parallel across the input terminal leads 36, 37, a magnetic core 38 of the shell type, a secondary winding $S_1$ inductively coupled with the primary windings $P_1$, $P_2$ and the nonlinear shunts 31, 32, which are interposed between the secondary winding $S_1$ and the primary windings $P_1$ and $P_2$. Cathode heating windings $H_1$ and $H_2$ are inductively coupled with primary winding $P_1$ and cathode heating winding $H_3$ is inductively coupled with primary winding $P_2$. The cathode heating windings $H_1$, $H_2$ and $H_3$ provide continuous heating current to the filaments 39, 40, 41, 42 of the lamps 1 and 2. The output of the high reactance ballast transformer 33 is applied across the serially connected lamps 1, 2 by a plurality of output leads including leads 43 and 44, output lead 43 being connected in circuit with one end of the secondary winding $S_1$ and the other output lead 44 being connected in circuit with primary winding $P_1$ and input terminal lead 37.

It will be seen that cathode heating winding $H_1$ is connected in circuit with filament 42 by output leads 44 and 45. Filament 39 of lamp 2 is coupled with cathode heating winding $H_2$ by means of leads 43, 46 and 47 while cathode heating winding $H_3$ is connected in circuit with filaments 40, 41 of lamps 1, 2 by means of electrical leads 48, 49.

A capacitor $C_5$ is connected in series with secondary winding $S_1$ to provide a net capacitive reactance in the secondary circuit thereby causing a leading current to flow in the secondary winding $S_1$. A starting capacitor $C_6$ is connected across lamp 2 to initially cause the open circuit voltage to be applied across lamp 1, which is the first lamp to be fired. Resistors $R_3$ and $R_4$ provide a discharge path for the capacitors $C_5$ and $C_6$ when the ballast apparatus 30 is deenergized.

According to one form of my invention, the shunting capacitor $C_4$ and an inductor $L_3$ are connected in series circuit relation. Preferably, the shunting capacitor $C_4$ is tuned with the secondary winding $S_1$ to provide an open circuit voltage substantially at the seventh harmonic frequency or a frequency of 420 cycles per second. During the operating condition of the ballast apparatus 30, the inductor $L_3$ serves as impedance element to control the discharge of the shunting capacitor $C_4$ in each half cycle to stabilize the spikes in the lamp current waveform and thereby provide a stable lamp current.

An advantage of the present invention is that it can be applied in conjunction with other known ways of improving lamp current waveform, such as nonlinear shunts and bridged gaps, to achieve still further improvements in ballast performance. It will be appreciated, however, that the benefits of the present invention can be realized without utilizing nonlinear shunts of the prior art.

By way of a more specific exemplification of the invention, the ballast apparatus 30, shown in FIGURES 2 and 3, was constructed for starting and operating two 96 PG 17 Power groove lamps. The ballast apparatus 30 was contained in a ballast case 34 having the following outer dimensions: 18½ inches long, 3 inches wide and 2¹⁹⁄₃₂ inches high. An elongated shell type of high reactance ballast transformer 33, such as is illustrated in FIGURE 3, was used.

Referring now more specifically to FIGURE 3, outer yoke legs 50, 51 of the magnetic core 38 were formed by laminations of magnetic steel .025 inch in thickness and were stacked to a height of 1.422 inches. Center winding leg 52 was comprised of a stack of laminations stacked to a height of 1.422 inches.

As is shown in FIGURE 3, a pair of core clamps 56, 57 are provided to hold the outer yoke legs 50, 51 and the center winding leg 52 in assembled relation. Three slots 53, 54, 55 were formed in the center winding leg 52 to form a series of bridged gaps which control the secondary leakage flux and thereby prevent saturation of the winding leg under the secondary winding $S_1$. Five laminations having a thickness of .025 inch were inserted between the primary winding $P_1$ and the secondary winding $S_1$ and also between the primary winding $P_2$ and the secondary winding $S_1$ to form the nonlinear shunts 31, 32.

The primary windings $P_1$ and $P_2$ were wound with 356 turns of No. 19 copper wire and the secondary winding $S_1$ was wound with 1276 turns of No. 20 copper. The starting capacitor $C_6$ had a capacitance of .07 microfarad and the series capacitor $C_5$ provided a capacitance of 9.8 microfarads. The inductor $L_3$ was a conventional inductor having 242 turns of No. 28 wire wound on the center winding leg of a core formed of E and I laminations and provided an inductance of .046 henries. The inductor $L_3$ was disposed in a rectangular-shaped insulator 9 made of cardboard to insulate the inductor $L_3$ from exposed leads and terminals. The shunting capacitor $C_4$ had a capacitive value of .37 microfarad, which was found to be sufficient to tune the secondary circuit at substantially the seventh harmonic frequency. The open circuit R.M.S. voltage across the output leads 43, 44 was 500 volts and the peak voltage was approximately 1000 volts, with an input voltage at 10% below the rated input voltage.

In order to illustrate the improvement obtained by the practice of the present invention, I have illustrated in FIGURES 4, 5 and 6 the lamp current waveforms for a constant light output for the ballast apparatus 30 illustrated in FIGURE 2 and for two modifications thereof. The current waveform illustrated in FIGURE 4 represents the instantaneous current under operating conditions for a ballast apparatus as shown in FIGURE 2 modified so that the shunting capacitor $C_4$ and inductor $L_3$ have been omitted. In FIGURE 5 I have shown the lamp current waveform corresponding to a ballast apparatus of FIGURE 2 wherein the inductor $L_3$ was excluded and the shunting capacitor $C_4$ was tuned with the secondary winding $S_1$ to provide substantially a seventh harmonic starting voltage. The current waveform illustrated in FIGURE 6 represents the instantaneous lamp current for one cycle for the improved ballast apparatus 30 of the invention as shown in FIGURE 2.

It will be understood that the light output is a function of the average half cycle current through the lamps 1, 2 and the heat generated in the secondary winding $S_1$ is a function of the R.M.S. half cycle current through the lamps 1 and 2. Thus, the ideal waveform for the lamp current is essentially a square waveform since the lamp power factor will be almost unity and since maximum light output and minimum heating losses are obtained when the lamp power factor is unity or when the waveform is essentially square.

The waveshapes of the instantaneous lamp currents as shown in FIGURES 5 and 6 more nearly approach a square shape than the current waveform shown in FIGURE 4. It will be observed that a very sharp spike of current occurs in the early portion of each half cycle as shown by the waveform of FIGURES 5 and 6. These spikes of current are due to the fact that the shunting capacitor $C_4$ stores up energy in each half cycle and releases this energy as the voltage alternates. It is believed that this initial spike in the early portion of each half cycle aids in the reignition of the lamps in each half cycle. When the current spike falls below the minimum value required for reignition, the lamps will reignite later in the half cycle resulting in a diminished lamp output.

When the current waveform shown in FIGURE 5 was viewed on an oscilloscope, it was found that the waveform of the lamp current in one half cycle was not symmetrical with the waveform of the current in the subsequent half cycle. The current spikes occurring in an arbitrarily selected half cycle were found to vary as much as plus or minus 10 percent from a mean value of the amplitude of the current. The lamp current waveform can be made symmetrical in each half cycle by providing an impedance element, such as an inductor or a resistor in the discharge path of the shunting capacitor. The impedance element was foundt to minimize the sharpness of these current spikes and provide a stable lamp current.

Although the mode of operation of the impedance element $L_3$ is not precisely understood, it is believed that the impedance element $L_3$ controls the rate of the discharge of the energy stored in the shunting capacitor $C_4$ as is evidenced by the wider spikes of current in waveform shown in FIGURE 6. Further, it is believed that the initial spike of current provides sufficient energy to ionize the lamps 1, 2 and thereby aids in reigniting the lamps 1, 2 early in each half cycle. In part, the instability of the narrow sharp spike occurring in the early portion of the half cycle as shown in FIGURE 5, may be due to the fact that the sharp spike almost instantaneously drops to a lower level before the lamps 1 and 2 have a chance to ionize. By placing the impedance element in the discharge control path of the shunting capacitor, control of the released energy from the shunting capacitor in each half cycle is achieved.

The advantages of the present invention can be realized in a ballast apparatus for starting and operating a single lamp as well as for starting and operating two or more fluorescent lamps. In FIGURE 7 I have illustrated a ballast apparatus 60 adapted for operating one rapid start type of fluorescent lamp 1 and employing an impedance element $R_8$ and a shunting capacitor $C_8$ in accordance with the invention. The ballast apparatus 60 is shown enclosed in a ballast case 61 shown schematically by a dashed rectangle. A pair of input leads 62, 63 are provided for connecting the primary winding P of a high reactance ballast transformer 64 across a suitable alternating current source. A leakage leg 65 is interposed between the primary and a secondary winding S which is inductively coupled therewith on a magnetic core 66. A pair of output leads 67, 68 apply the output of the high reactance transformer 64 across the lamp 1, which is capacitively coupled to a grounded conductive plate 69.

In order to keep filament 71 of lamp 1 continuously supplied with heating current, cathode heating winding $H_1$ is inductively coupled with the primary winding P and is connected in circuit with the filament 71 by means of output lead 68 and electrical lead 72. Cathode heating winding $H_2$ is inductively coupled with the primary winding P and is connected in circuit with filament 70 by electrical leads 73, 74 and output lead 67. A capacitor $C_7$ connected in series circuit relation with the secondary winding S serves the purpose of providing a net capacitive reactance in the secondary circuit. A bleeder resistor $R_7$ is connected in shunt with capacitor $C_7$.

In order to control the discharge of a shunting capacitor $C_8$, a resistor $R_8$ is connected in series circuit with the shunting capacitor $C_8$. In this embodiment of the invention the shunting capacitor $C_8$ was also tuned to provide an open circuit voltage having preselected harmonic components. The resistive value of the discharge resistor $R_8$ was such that it provided sufficient control of the rate of discharge of the shunting capacitor $C_8$ in each half cycle of lamp current to stabilize the current but not enough to overdampen the open circuit voltage tuning.

By way of comparison and in order to demonstrate the advantages achieved by the ballast apparatus of the invention, the ballast apparatus shown in FIGURE 2 was tested and compared with a similar ballast designed to operate the same lamps, which did not have the serially connected shunting capacitor $C_4$ and impedance element $L_3$. The gross weight of iron required in the apparatus and the performance characteristics are presented in Table I.

*Table I*

|  | Ballast Apparatus With Shunting Capacitor And Impedance Element | Ballast Apparatus Without Shunting Capacitor And Impedance Element |
| --- | --- | --- |
| Gross Weight of Iron in Pounds | 7.16 | 8.80 |
| Input Watts | 463 | 453 |
| Percent Light Output | 96.0 | 91.5 |
| Total I²R Losses | 21.2 | 23.0 |
| Total Core Loss | 16.45 | 20.65 |
| Lamp Power Factor | 90.2 | 77.6 |
| Lamp Volt-Amperes | 450 | 499 |

From the data presented in Table I, it will be seen that an increase of 4.5 percent in light output is obtained with only a 2.2 percent increase in the power input. The lower lamp volt-ampere requirement and the lower secondary I²R losses indicate that a ballast apparatus utilizing less copper and steel for the same heating performance can be obtained by the use of a shunting capacitor and impedance element in accordance with the invention. An improvement can also be obtained in lamp current waveform. This is significantly evidenced by the lamp power factor which was found to be 90.2 percent for the improved ballast apparatus having a serially connected shunting capacitor and impedance element as compared to 77.6 percent for ballast apparatus without the serially connected capacitor and impedance element. Considering this invention in its broader aspects, it will be understood that the impedance element and the lamps are connected serially in the discharge path of the shunting capacitor thereby enabling the impedance element to produce the improved results.

It will be appreciated therefore that the specific embodiments of the invention which I have described herein may be changed or varied without departing from the principle of the invention. It is to be understood, therefore, that I intend by the appended claims to cover all such changes and modifications that fall within the true spirit and scope of the invention.

What I claim as new and desire to secure by Letters Patent of the United States is:

1. A ballast apparatus for fluorescent lamps comprising a high reactance transformer with a primary winding and a secondary winding inductively coupled on a magnetic core, said magnetic core having at least one bridged section under the secondary winding, a first output lead and capacitor connected in series circuit with the secondary winding of the high reactance transformer, a second output lead connected in circuit with said high reactance transformer so that the transformer output appears at said first and second output leads, and a shunting circuit connected in parallel circuit relation with the secondary winding of said high reactance transformer, said shunting circuit including a shunting capacitor discharging in the early portion of each half cycle of the lamp current to provide a current spike sufficient in magnitude to aid reignition of a lamp connected across said first and second output leads and further including an inductive impedance element connected in series circuit with the shunting capacitor across said secondary winding of the high reactance transformer and inductively isolated from said high reactance transformer.

2. A ballast apparatus for starting and operating at least one gaseous discharge lamp comprising a shell type high reactance transformer including a pair of output leads for supplying the output current thereof to the lamp, said high reactance transformer including a primary winding having a pair of input leads for connection to a source of alternating current and at least one secondary winding, a first capacitor connected in series with said secondary winding, and a shunting circuit comprising a second capacitor and a serially connected inductive impedance element, said shunting circuit being connected in parallel circuit relation with said secondary winding, said shunting capacitor discharging in the early portion of each half cycle of the output current to provide a current spike sufficient in magnitude to aid reignition of the lamp connected across said pair of output leads, and said inductive impedance element being inductively isolated from the high reactance transformer.

3. A ballast apparatus for starting and operating at least one gaseous discharge lamp from an alternating power supply, said ballast apparatus comprising a shell type high reactance transformer having at least one primary winding and at least one secondary winding, a first capacitor connected in series with said secondary winding, a shunting capacitor, an impedance element connected in series circuit with the shunting capacitor, means connecting said series circuit in parallel circuit relation with said secondary winding, said shunting capacitor and secondary winding being tuned to provide preselected harmonic voltage components under open circuit conditions, said primary winding having a pair of input terminal leads for connection across an alternating power supply, and circuit means including a plurality of output leads for applying the combined output of said transformer and secondary circuit across the output leads, said shunting capacitor discharging in the early portion of each half cycle to provide current spikes at said output leads to aid in early reignition of the lamp in each half cycle, and said impedance element controlling the discharge of said shunting capacitor in each half cycle to provide a stable lamp current.

4. A ballast apparatus for starting and operating at least one gaseous discharge lamp from an alternating power supply comprising a shell type transformer having a magnetic core, a primary winding and a secondary winding inductively coupled therewith on said magnetic core, a pair of input leads for connection to said alternating power supply, said primary winding of said transformer being connected across said input leads, a series capacitor connected in series circuit relation with said secondary winding to provide a net capacitive reactance in the secondary circuit of said transformer, a shunting capacitor connected in parallel circuit relation with said secondary winding, circuit means including a plurality of output leads for supplying the output current of the apparatus to the lamp, said shunting capacitor being discharged to provide a current spike to aid reignition of the lamp in the early portion of each half cycle of the output current provided at the output leads, and an impedance element connected in series circuit with said shunting capacitor and across said secondary winding and series capacitor to control the discharge of said secondary winding in each half cycle, said impedance element being inductively isolated from the transformer.

5. A ballast apparatus for starting and operating a pair of fluorescent lamps from an alternating power supply, said ballast apparatus comprising a shell type transformer having an elongated magnetic core, at least one primary winding, and a secondary winding inductively coupled with said primary winding on said magnetic core, a pair of input leads for connection to an alternating power supply, said primary winding being connected across said input terminal leads, a series capacitor connected in series circuit relation with the secondary winding to provide a net capacitive reactance in the secondary circuit of said transformer, a shunting capacitor and an impedance element connected in series circuit with said shunting capacitor, said shunting capacitor and said impedance element being connected in parallel circuit relation with said secondary winding and said series capacitor, said impedance element being inductively isolated from the transformer, and circuit means including a plurality of output leads and a starting capacitor for supplying the output current of the apparatus to said fluorescent lamps, said shunting capacitor discharging during the early portion of each half cycle of the output current to aid the reignition of the lamp in each half cycle and said impedance element stabilizing the discharge of said shunting capacitor.

6. A ballast apparatus for starting and operating fluorescent lamps from an alternating power source, said apparatus comprising a high reactance transformer having a magnetic core, at least one primary winding and at least one secondary winding inductively coupled with said primary winding on said magnetic core, said magnetic core having at least one bridged section under the secondary winding, a capacitor connected in series with said secondary winding, a pair of input leads for connection in circuit with an alternating power supply, said primary winding being connected across said input leads, a shunting capacitor, an impedance element connected in series with said shunting capacitor to form a series circuit, means connecting said series circuit in parallel circuit relation with said secondary winding, said shunting capacitor being tuned with said secondary winding at substantially the seventh harmonic frequency relative to the fundamental frequency of the alternating power source, and circuit means including a plurality of output leads for supplying the output current to the lamps, said shunting capacitor discharging in the early portion of each half cycle of the output current to provide spikes of current sufficient to aid reignition of the lamps early in each half cycle.

7. A ballast apparatus for starting and operating a pair of fluorescent lamps from an alternating power supply, said ballast apparatus comprising a high reactance transformer having at least one primary winding and at least one secondary winding, said primary winding having a pair of input terminal leads for connection across an alternating power supply, a series secondary circuit including at least a capacitor and said secondary winding, a shunting circuit including a serially connected capacitor and discharge impedance element, said shunting circuit being connected in parallel circuit relation with said secondary winding, said impedance element controlling the discharge of said shunting capacitor, said secondary circuit and shunting capacitor being tuned to provide components at substantially the seventh harmonic frequency relative to the fundamental frequency of the alternating power source under open circuit condition, and circuit means including a pair of output leads for applying the combined output of said high reactance transformer and secondary circuit across the fluorescent lamps and including a starting capacitor connected in circuit with one of the output leads and a lead for placing the starting capacitor in shunt with one of the fluorescent lamps to cause said combined output under the open circuit condition to be applied initially across the other one of the fluorescent lamps, said shunting capacitor discharging in the early portion of each half cycle to provide a current spike at said output leads sufficient to aid in the reignition of the lamps early in each half cycle.

8. A ballast apparatus for operating fluorescent lamps from an alternating power supply, said ballast apparatus comprising a shell type transformer having an elongated magnetic core, at least one primary winding, at least one secondary winding inductively coupled therewith on said magnetic core, said magnetic core having at least one bridged section under the secondary winding, a pair of input leads for connection to an alternating power supply, said primary winding being connected across said input terminal leads, a series capacitor connected to the circuit in series circuit relation with said secondary winding to provide a net capacitance reactance in the secondary circuit of said transformer, a shunting capacitor, an inductive impedance element connected in series circuit with said shunting capacitor and inductively isolated from the transformer, said shunting capacitor and said impedance element being connected in parallel circuit relation with said secondary winding and said series capacitor, said shunting capacitor providing sufficient capacitive reactance in parallel relation with the secondary winding to cause the open circuit voltage to be tuned substantially at the seventh harmonic frequency relative to the fundamental frequency of the alternating power supply, and circuit means including at least a pair of output leads for supplying the output current of the apparatus to the lamps, said shunting capacitor discharging during the early portion of each half cycle of the output current through said impedance element and the lamps.

9. A ballast apparatus for starting and operating a pair of fluorescent lamps from an alternating power supply, said ballast apparatus comprising a high reactance transformer having a magnetic core, a primary winding and a secondary winding inductively coupled therewith on said magnetic core, said magnetic core having at least one bridged section under the secondary winding, a pair of input leads for connection to an alternating power supply, said primary winding of said transformer being connected across said input leads, a first capacitor connected in series with said secondary winding, a shunting circuit connected in parallel circuit relation with said secondary winding, said shunting circuit consisting of a serially connected shunting capacitor and impedance element, and circuit means including a pair of output leads for supplying the output current of the apparatus, said shunting capacitor providing sufficient capacitive reactance to cause the open circuit voltage at said output leads to be tuned at substantially a seventh harmonic frequency relative to the fundamental frequency of the alternating power supply, said shunting capacitor discharging in each half cycle during the operating condition to provide a current spike sufficient to aid in the early reignition in each half cycle of the lamp current of the lamps connected across the output leads.

10. A ballast apparatus for starting and operating at least one fluorescent lamp from an alternating power supply, said ballast apparatus comprising a high reactance transformer having at least one primary winding and at least one secondary winding inductively coupled therewith on a magnetic core, a shunting capacitor, a resistor connected in series relation with the shunting capacitor, a secondary circuit including at least said secondary winding and a capacitor in series therewith, said serially connected shunting capacitor and said resistor being connected in parallel circuit relation with said secondary winding, and circuit means including a pair of output leads for applying the combined output of said transformer and secondary circuit across a gaseous discharge lamp connected across the output leads, said shunting capacitor discharging in the early portion of each half cycle of the lamp current to provide a current spike at said output leads to aid early reignition of the lamp in each half cycle, and said resistor controlling the discharge of said shunting capacitor in each half cycle of the lamp current.

11. An apparatus comprising a high reactance transformer having at least one primary winding for connection with an alternating current source and at least one secondary winding inductively coupled with the primary winding on a magnetic core, a shunting capacitor connected in parallel circuit relation with said secondary winding, a series capacitor connected in series circuit relationship with the secondary winding and providing a net capacitive reactance in series with the secondary winding, said shunting capacitor and said secondary winding being tuned to provide harmonic voltage components substantially at the seventh harmonic frequency with respect to the fundamental frequency of the alternating current source, a circuit means including a plurality of output leads, a fluorescent lamp connected in circuit with the output leads, said shunting capacitor discharging in the early portion of each half cycle to provide a current spike to said lamp sufficient to aid the early reignition thereof in each half cycle, and an inductor connected in series with said shunting capacitor across said secondary winding and in the discharge path of said shunting capacitor during the open circuit condition to control the discharge thereof, said inductor being inductively isolated from the high reactance transformer, and the combination of said series connected inductor and shunting capacitor being connected in parallel with said secondary winding.

References Cited by the Applicant

UNITED STATES PATENTS

| 2,487,092 | 11/1949 | Bird | 315—239 |
| 2,960,624 | 11/1960 | Strecker | 315—100 |

FOREIGN PATENTS

| 1,035,405 | 8/1953 | France. |
| 620,006 | 3/1949 | Great Britain. |

GEORGE N. WESTBY, *Primary Examiner.*